United States Patent [19]

Petersen

[11] 4,093,198
[45] June 6, 1978

[54] COIL SPRING DEVICE

[76] Inventor: Tom Lindhardt Petersen, Sodingevej 6, 5750 Ringe, Denmark

[21] Appl. No.: 796,384

[22] Filed: May 12, 1977

Related U.S. Application Data

[63] Continuation of Ser. No. 661,562, Feb. 26, 1976, abandoned.

[30] Foreign Application Priority Data

Feb. 26, 1975 Denmark .................................. 738/75

[51] Int. Cl.² .............................................. F16F 1/12
[52] U.S. Cl. ...................................... 267/179; 267/60; 272/52
[58] Field of Search ................... 267/60, 61 R, 61 S, 267/62, 74, 160, 166, 167, 170, 177–179; 248/358 AA, 399; 272/52, 54, 55, 56; 297/208, 209

[56] References Cited

U.S. PATENT DOCUMENTS

| 2,801,841 | 8/1957 | Blythe | 267/60 X |
| 2,896,940 | 7/1959 | Lightbourn | 267/60 X |
| 2,996,298 | 8/1961 | Grosse et al. | 272/52 |
| 3,292,924 | 12/1966 | Wormser et al. | 272/54 |
| 3,773,309 | 11/1973 | Carter | 267/61 S |

Primary Examiner—Johnny D. Cherry
Attorney, Agent, or Firm—Craig & Antonelli

[57] ABSTRACT

A spring supported device such as especially a playground toy comprising a heavy coil spring the opposite ends of which are affixed to mutually movable parts such as a seat element and a support element anchored to the ground, respectively, so as to enable said parts to be moved resiliently by compressing, expanding or bending the spring, the spring at least at one end being wound and shaped in such a manner that the outermost winding has a small pitch and defines a support surface substantially normal to the axis of the coil spring, this outermost winding continuing, towards the opposite end of the spring, in a winding portion of increased or increasing pitch; for eliminating the jamming hazard in the narrow wedge shaped space between the outer winding portions there is mounted, at some point or area in this space, a distance piece between the windings, and connector means are provided for clamping the windings against the distance piece in order to lock the windings rigidly together at a place where the distance between the windings is large enough to exclude jamming of fingers or toes when the device is in use.

12 Claims, 6 Drawing Figures

COIL SPRING DEVICE

This is a continuation of application Ser. No. 661,562, filed Feb. 26, 1976, now abandoned.

The present invention relates to heavy coil springs and more particularly to devices such as playground toys having one or more exposed, heavy coil springs mounted between two mutually movable parts, e.g., a toy seat element and a support element anchored to the ground, so as to enable said parts to be moved resiliently relative to each other by compression, expansion or bending of the coil spring, a typical example of such a device being a seesaw type apparatus in which the seesaw board is centrally supported by means of a coil spring having one end rigidly secured to the seesaw board and its other end rigidly secured to a ground anchored support element. Instead of a seesaw board the spring may serve to support a seat for a single child, who may then swing the seat resiliently endwise or crosswise on the spring by causing the spring to bend.

Springs of the type considered normally have, at least at one end, an outermost winding of small pitch which is wound and shaped so as to define a support surface substantially normal to the axis of the coil spring, the said outermost winding continuing, towards the opposite end of the spring, in a winding portion of gradually increasing pitch and then in a main body portion of the spring wherein the windings have a constant, relatively large pitch.

Even though the spring windings are generally mutually spaced so much that they cannot possibly be clamped entirely together in normal use of the device, clamping problems may nevertheless occur adjacent the ends of the spring, where a wedge shaped space exists between the outermost winding portions of small pitch and the following winding portion of increased pitch. It may happen that a child holds a finger in the said space when the respective winding portions at the particular place are moved towards each other, mostly by a bending of the spring, whereby the finger may be seriously injured.

In order to counteract this jamming hazard the end of the spring might be covered by a surrounding shield, but the same hazard is then liable to occur between the end edge of the shield and other windings of the coil spring. Alternatively the spring could be shaped so as to extend along a broken line between the respective winding portions in such a manner that the said wedge shaped space is entirely avoided, but since normally the springs in question should be wound from a relatively thick spring steel rod, e.g., of a diameter of some 10–20 mm, it should normally be preferred for reasons of security to maintain the traditional spring shape, i.e., to make use of a spring presenting the said wedge shaped space adjacent the ends thereof.

It is a purpose of the invention to provide a device of the type referred to in which the said jamming hazard is minimized or eliminated in a simple manner.

The device according to the invention is characterized in that between the outermost winding portion of small pitch and an area or point of the winding portion of increased pitch there is mounted a substantially non-compressible distance element, and that between said winding portions in or adjacent the same area or point there is provided non-stretchable connector means preventing the respective winding portions from being moved away from each other. The said distance element and connector means being mounted at one or more places in which the respective winding portions are axially spaced from each other, the innermost portions of the said wedge shaped space will thus be locked against both contraction and expansion, and though outside this non-dangerous space there will still exist a wedge shaped space, the windings at the inner end of this space will be located in spaced relationship, and besides the wedge angle defined by the windings at this place will be relatively large, in practice so large that the opposed winding portions cannot be forced together to a mutual distance smaller than the said distance at the locked area. When this distance is large enough to easily allow a finger to be introduced between the windings adjacent the bottom of the outer wedge shaped space the finger may then not in any way be jammable, neither adjacent the bottom portion of the outer wedge space nor in this space at all.

In other words the said distance element and connector means, which are advantageously mounted immediately adjacent each other, serve to provide a mechanical and non-resilient short-circuit between the outermost winding and a winding portion axially spaced therefrom, whereby the innermost wedge shaped space is bridged in a stiff manner eliminating the jamming hazard.

In the following the invention is described in more detail, by way of examples, with reference to the accompanying drawing, in which.

Figure 1:
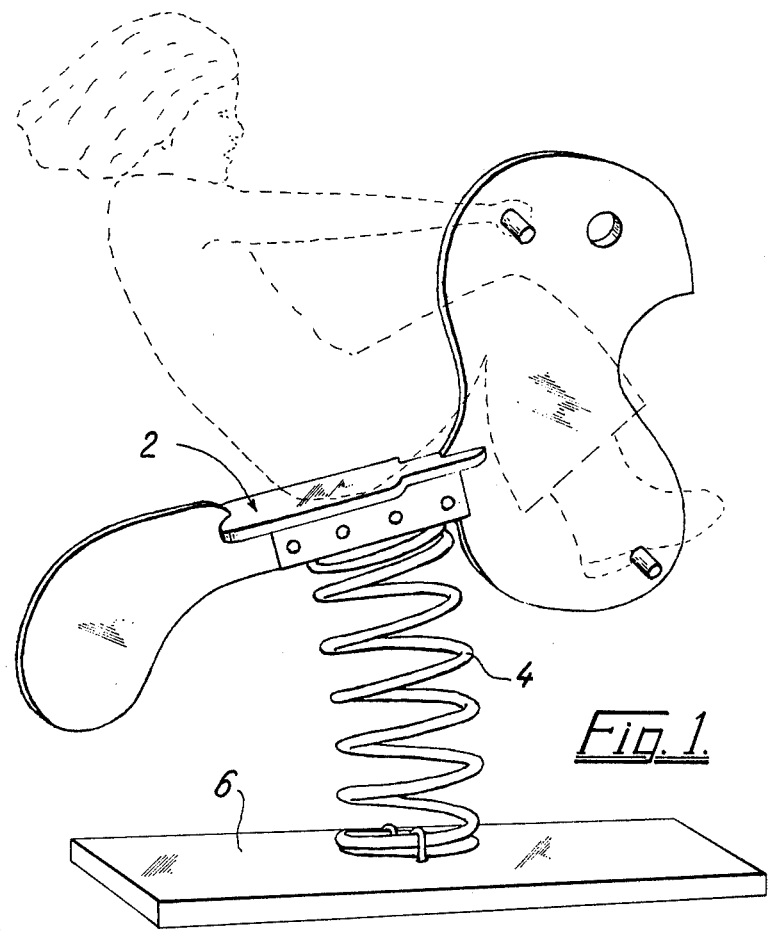
FIG. 1 is a perspective view of a playground toy according to the invention.

The toy shown in FIG. 1 comprises a seat portion 2 secured to the upper end of a strong coil spring 4, the lower end of which is secured to a mounting plate 6 which is supported or anchored to the ground, in a manner not shown. A child sitting on the seat 2 will be able to make the toy carry out various swinging movements, mainly by causing the spring 4 to be bent.

Figure 2:
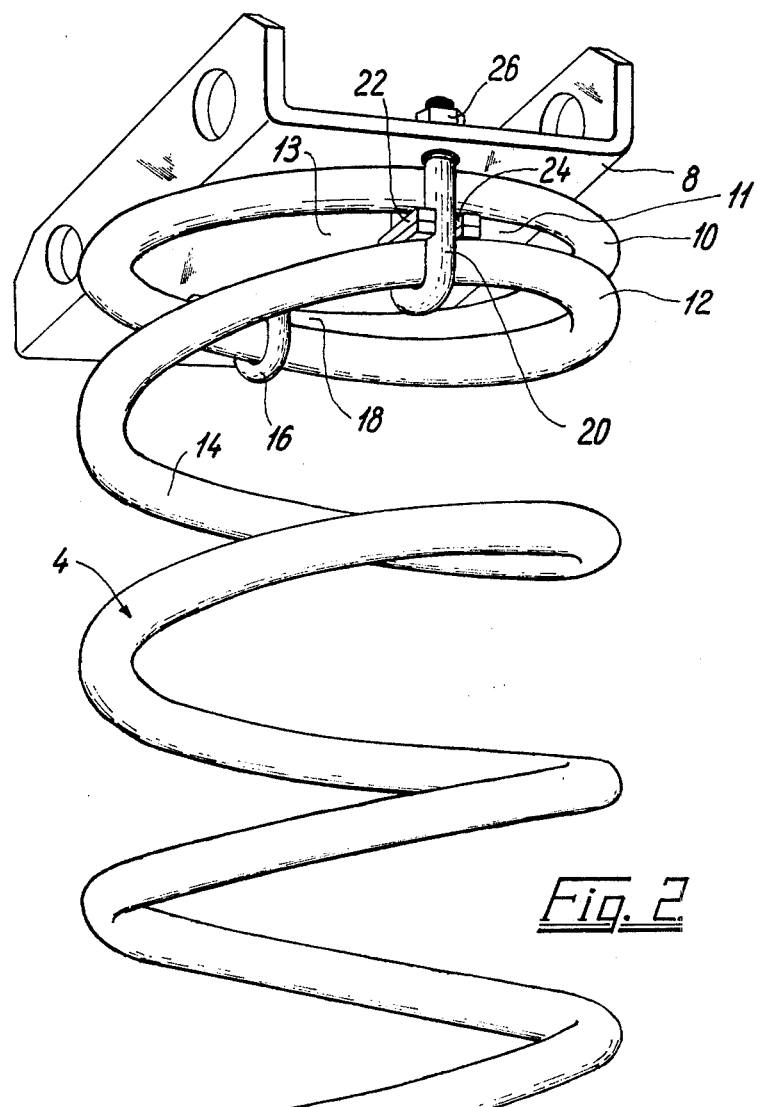
FIG. 2 is a perspective view of the carrier spring of the toy.
Figure 2:
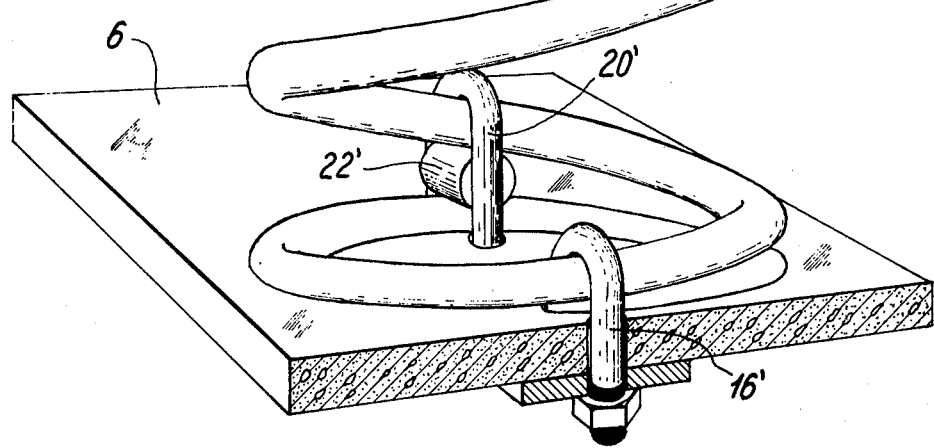

As shown in more detail in FIG. 2 there is secured to the upper end of the coil spring 4 a mounting bracket 8 to which th set portion 2 is secured. The planar bottom side of the bracket member 8 is rested against the top side of the uppermost winding 10 of the spring, this winding having a small pitch and having its top side shaped so as to be situated in a plane substantially normal to the axis of the spring. The top winding continues in a winding portion 12 having a downwardly increasing pitch until at a winding portion 14 it continues in the main spring portion having the characteristic pitch of the spring. The bracket member 8 is secured to the top end of the spring by means of a U-bolt 16 engaging a portion of the upper winding 10 preferably at a place underneath the free end portion 18 of the spring rod, whereby, when the U-member 16 is tightened upwardly by means of nuts adjacent the top side of the bracket member bottom, the flattened spring end portion 18 is tightly clamped together with the underlying winding portion, and a diametrically opposed U-member 20 projecting from the bracket 8 down about the winding portion 12. At this place, in the space between the winding portions 10 and 12 there is mounted a distance piece formed as a plate member 22, the opposed ends of which are provided with a notch 24 engaging with the leg portions of the U-member 20 in such a manner that the distance piece 22 is held by the U-member in a non-displaceable manner. The plate member 22 fills out the space between the windings 10 and 12 so as to be tightly clamped therebetween when the U-member 20 is tightened upwardly by means of nuts 26. As indicated, the plate member 22 may, of course, be composed of two or more superimposed, thin plate members.

Figure 4:
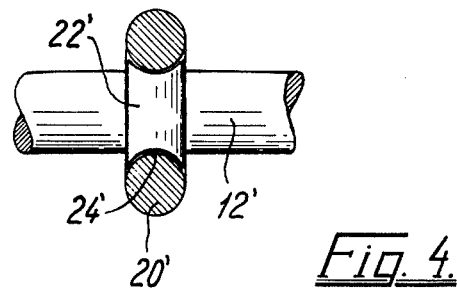
FIG. 4 is an elevation, partly in section, of the locking means used in the lower end of the spring shown in FIG. 2.

The lower end of the spring 4 is secured to the base element 6 in an exactly corresponding manner. It is shown by way of example that the distance piece 22' may be constituted by a cylindric rod element, but it will be understood that the invention is not limited to any particular shape of the distance element. As shown in FIG. 4 the opposed ends of the rod element 22' are preferably concavely recessed as shown at 24' in order to be safely held between the legs of the U-bolt 20'.

It will be appreciated that with the mounting arrangement described there is established a both pull- and pressure-stiff connection between the winding portions 10 and 12, whereby the movements of the spring 4 cannot give rise to any jamming effect in the narrow wedge shaped space 11 between the winding portions. In the wedge shaped space 13 at the other side of the connector parts 20 and 22 the distance between the winding portions is relatively large, and even if this distance is caused to be reduced during use of the toy the space will still be wide enough to exclude any jamming hazard.

It should be mentioned that it is, of course, well known to make use of U-members 16 and 20 for clamping the uppermost winding 10 against a mounting bracket 8, whereby the round end portion of the U-member 20 may act as a stiff distance piece between the winding portions 10 and 12 so as to prevent compression of the narrow wedge shaped space between these windings; however, in that case the distance piece is not in rigid connection with both winding portions, and jamming may occur, therefore, between the distance piece and the winding portion 12.

Figure 5:
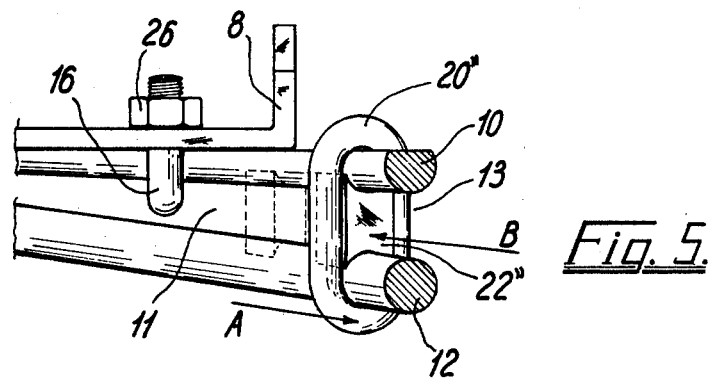
FIG. 5 is an elevation of a fraction of the top end of the spring provided with modified locking means.

The distance piece 22 should not necessarily be mounted exactly the same place as the connector member 20, since the combined effect of the distance piece and the connector member will be substantially the same if the distance piece is placed e.g., a few centimeters from the connector member 20 as seen in the circumferential direction of the spring 4, when it is only ensured that the distance piece is safely secured in the space between the windings 10 and 12. The non-stretchable connection member 20 should not necessarily be constituted by an element additionally serving to secure the bracket member 8 or the plate member 6 to the spring; it may be a closed member defining a certain maximum distance between the winding portions, while as the intermediate distance piece there is used a wedge element of another element, the effective thickness of which is increasable in such a manner that the winding portion 10, 12 are forced away from each other, against the opposed ends of the surrounding closed connector element corresponding to the member 20. As an example it is illustrated in FIG. 5 that the connector member 20" may be a closed eye member which is, prior to the mounting of the spring end to its associated part, slipped into its position along the outermost winding portions, the eye member being introduceable onto the windings just like a key being introduced onto the windings of a key-ring, i.e., by mechanically forcing the free, thin end of the outer winding 10 away from the underlying winding portion. The eye member is pushed in the direction of the arrow A until it is stopped by its engagement with both the winding portions 10 and 12. A distance piece 22" is placed between the winding portions 10 and 12, in the outer wedge shaped space 13, and pushed along the windings in the direction of the arrow B towards the narrow wedge space 11 until both its opposed end engage with the respective winding portions. The length of the distance piece 22" is so adapted that the distance piece will be stopped by the said engagement when it reaches a position inside the eye member 20". The members 20" and 22" may be provided with special means for holding them in their positions, e.g., clamping screws (not shown) cooperating with one of the windings 10 or 12, or they may be pushed or hammered into their positions by such high forces that they will safely hold themselves by their mutual clamping action adjacent their respective opposite ends.

As shown in dotted lines in FIG. 5 the distance piece 22" should not be necessity be mounted just inside the eye member, i.e., in the eye opening thereof, as the desired result is obtainable even if the final position of the distance piece is somewhat offset from the eye member, whether at one or the other side of the eye member.

Figure 6:
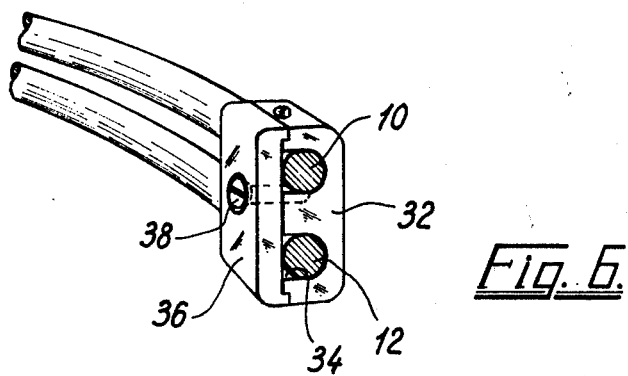
FIG. 6 is a sectional view of further modified locking means.

FIG. 6 shows an embodiment in which the locking means are constituted by a rigid block member 32 provided with spaced grooves 34 for receiving the respective winding portions and a cover plate 36 which is securable to the block member 32 by means of a screw 38, upon the block member being inserted radially onto the spring winding portions. The block member serves to lock the winding portions against movement both towards and away from each other, and as it can be mounted at one place only, where the natural distance between the windings corresponds to the distance between the grooves 34, it will not be necessary, though maybe desirable, to lock the block member by a clamping screw or the like against displacement along the windings.

The eye member 20" shown in FIG. 5 may, of course, be substituted by a U-bolt having a cross yoke and tightening nuts corresponding to the nuts 26 in FIG. 2, whereby the U-bolt may be actively clamped to the windings at any selected place thereon. The distance piece 22", if mounted immediately at one side or the other of the eye member, may be substituted by a wedge shaped or frustro conical block which is urged into the space between the windings so as to clamp these against the respective opposite ends of the eye member.

As illustrated in FIGS. 5 and 6 the winding locking means should not necessarily as in FIG. 2 additionally constitute means for securing the spring end to its associated part, but it will be appreciated that it is advantageous to use the locking means additionally for this purpose.

Figure 3:
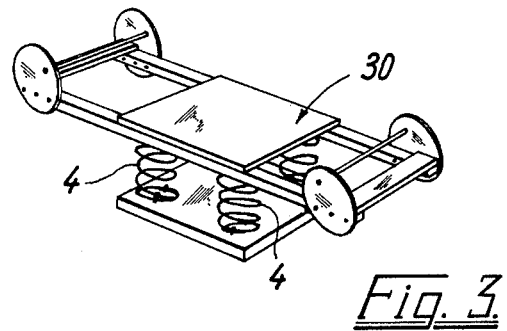
FIG. 3 is a perspective view of another playground toy according to the invention.

By way of example FIG. 3 shows another playground toy, generally designated 30, and as clearly shown being of the seesaw type, supported by four coil spring 4 which are all (in a manner not shown) secured to the seesaw toy 30 in the manner described hereinbefore. In this embodiment the springs 4 will not be liable to be bent, but rather to be compressed and expanded according to the tilting movement of the seesaw, and the use of several springs 4 involves that the seesaw 30 is stabilized against excessive horizontal rotary movements.

It will be understood that the invention is not limited to spring supported playground toys, since the invention will be applicable in connection with any kind of device in which there is used one or more heavy coil springs which are exposed in such a manner that the described jamming hazards are liable to occur.

It should be mentioned that the distance element should not necessarily be provided so as to leave the narrow wedge shaped space 11 open; the distance element may be shaped correspondingly itself, i.e., so as to fill out the entire space 11.

What is claimed is:

1. A device such as a playground toy, comprising a heavy coil spring, the opposed ends of which are affixed to respective opposed parts so as to render these parts mutually resiliently moveable by compression, expansion or bending of the coil spring, said spring at least at one end thereof having an outermost winding of small pitch and a following winding of increased or increasing pitch confining together with said outermost winding a helical wedge shaped space, a substantially non-compressible distance element being arranged in a portion of said wedge shaped space between and in engagement with respective winding portions, said distance element causing a first portion of said windings on one side of said distance element to be substantially locked at a mutual distance apart and said distance element causing a second portion of said windings on an opposite side of said distance element to maintain a minimum freespace both between said windings and adjacent the sides thereof of a size sufficient to prevent body appendages of a user from becoming jammed between said windings, and a substantially non-stretchable connector means being arranged adjacent said distance element so as to hold the respective winding portions in said engagement with the distance element and prevent the winding portions from being moved away from each other.

2. A device according to claim 1, in which said connector means is mounted immediately adjacent said distance element and is length adjustable so as to be operable to clamp the respective winding portions together, against the respective opposed ends or sides of the distance element.

3. A device according to claim 2, in which said connector means is constituted by a U-bolt having a cross yoke and tightening nuts adjacent its open end.

4. A device according to claim 3, in which said U-bolt extends generally in the axial direction of the spring and has its free legs projecting through holes in a mounting base plate arranged on the end of the spring.

5. A device according to claim 2, in which the connector means is arranged so as to additionally clamp the respective winding portions, spaced by said distance element, against said part affixed to the end of the spring, so as to contribute to the fixation thereof.

6. A device according to claim 1, in which said connector means comprises connector rod means extending closely outside the space between the respective winding portions across and at both sides thereof, the distance element projecting laterally from said space and being provided with holes or recesses engaged by said connector rod means.

7. A device according to claim 1, wherein said distance element is formed of a block-like member.

8. A device according to claim 1, wherein an additional freespace is defined between said first portion of said windings on said one side of said distance element.

9. A device such as a playground toy, comprising a heavy coil spring, the opposed ends of which are affixed to respective opposed parts so as to render these parts mutually resiliently moveable by compression, expansion or bending of the coil spring, said spring at least at one end thereof having an outermost winding of small pitch confining together with said outermost winding a helical wedge shaped space, a substantially non-compressible distance element being arranged in a portion of said wedge shaped space between and in engagement with respective winding portions, said distance element causing a first portion of said windings on one side of said distance element to be substantially locked at a mutual distance apart and said distance element causing a second portion of said windings on an opposite side of said distance element to maintain a minimum freespace therebetween of a size sufficient to prevent body appendages of a user from becomming jammed between said windings, and a substantially non-stretchable connector means being arranged adjacent said distance element so as to hold the respective winding portions in said engagement with the distance element and prevent the winding portions from being moved away from each other, wherein said distance element is formed of a block-like member, and extends about said windings.

10. A device such as a playground toy, comprising a heavy coil spring, the opposed ends of which are affixed to respective opposed parts so as to render these parts mutually resiliently moveable by compression, expansion or bending of the coil spring, said spring at least at one end thereof having an outermost winding of small pitch confining together with said outermost winding a helical wedge shaped space, a substantially non-compressible distance element being arranged in a portion of said wedge shaped space between and in engagement with respective winding portions, said distance element causing a first portion of said windings on one side of said distance element to be substantially locked at a mutual distance apart and said distance element to be substantially locked at a mutual distance apart and said distance element causing a second portion of said windings on an opposite side of said distance element to maintain a minimum freespace therebetween of a size sufficient to prevent body appendages of a user from becomming jammed between said windings, and a substantially non-stretchable connector means being arranged adjacent said distance element so as to hold the respective winding portions in said engagement with the distance element and preventing the winding portions from being moved away from each other, wherein said distance element is formed of a block-like member, and is formed of a plurality of plates.

11. A device such as a playground toy, comprising a heavy coil spring, the opposed ends of which are affixed to respective opposed parts so as to render these parts mutually resiliently moveable by compression, expansion or bending of the coil spring, said spring at least at one end thereof having an outermost winding of small pitch confining together with said outermost winding a helical wedge shaped space, a substantially non-compressible distance element being arranged in a portion of said wedge shaped space between and in engagement with respective winding portions, said distance element causing a first portion of said windings on one side of said distance element to be substantially locked at a mutual distance apart and said distance element causing a second portion of said windings on an opposite side of said distance element to maintain a minimum freespace therebetween of a size sufficient to prevent body appendages of a user from becoming jammed between said windings, and a substantially non-stretchable connector means being arranged adjacent said distance element so as to hold the respective winding portions in said engagement with the distance element and prevent the winding portions from being moved away from each other, wherein said distance element is a cylindrical member.

12. A device according to claim 11, wherein said cylindrical member is a circular cylinder having notch endfaces.

* * * * *